United States Patent
Rüping

(10) Patent No.: US 8,005,653 B2
(45) Date of Patent: Aug. 23, 2011

(54) MODELLER FOR A HIGH-SECURITY SYSTEM

(75) Inventor: Stefan Rüping, Lengdorf (DE)

(73) Assignee: Infineon Technologies AG, Neubiberg (DE)

( * ) Notice: Subject to any disclaimer, the term of this patent is extended or adjusted under 35 U.S.C. 154(b) by 959 days.

(21) Appl. No.: 11/691,826

(22) Filed: Mar. 27, 2007

(65) Prior Publication Data
US 2008/0209257 A1 Aug. 28, 2008

(30) Foreign Application Priority Data

Feb. 28, 2007 (DE) .......................... 10 2007 009 726

(51) Int. Cl.
*G06F 7/60* (2006.01)
*G06F 17/10* (2006.01)
(52) U.S. Cl. .......................................................... 703/2
(58) Field of Classification Search ...... 703/2; 714/100, 714/699
See application file for complete search history.

(56) References Cited

U.S. PATENT DOCUMENTS
5,842,202 A * 11/1998 Kon ................................. 707/3

OTHER PUBLICATIONS

Nikolaizik J. et al., "Fehlertolerante Mikrocomputersysteme", 1. Auflage, Verlag Technik GmbH Berling, pp. 144-164. (1990).
German Office Action for German Patent Application No. 10 2007 009 726.5 mailed Nov. 29, 2007 (4 pages).

* cited by examiner

*Primary Examiner* — Paul L Rodriguez
*Assistant Examiner* — Luke Osborne
(74) *Attorney, Agent, or Firm* — Dicke, Billig & Czaja, PLLC

(57) ABSTRACT

A modeller for a system for determining a residual error probability. The modeller includes a component modeller, which is adapted to receive an error probability and to model a change of the error probability due to a behaviour of a system component, in order to output a changed error probability as residual error probability.

9 Claims, 4 Drawing Sheets

MODELLER FOR A HIGH-SECURITY SYSTEM

CROSS-REFERENCE TO RELATED APPLICATION

This application claims priority from German Patent Application No. 102007009726.5, which was filed on Feb. 28, 2007 and is incorporated herein by reference in its entirety.

TECHNICAL FIELD

The present invention refers to a modeller for a high-security system, such as it can be present e.g. in the field of the smart cards or security cards.

BACKGROUND

High-security systems, such as e.g. smart cards or security cards, require a high safety level and resistance to attacks from outside. In the field of the conventional technique, one distinguishes e.g. "faults", which refer to a physically induced failure e.g. of a circuit in a chip, and so-called "errors", which refer to a failure of a system that can be observed from outside. "Errors" are based on "faults" that have an influence on the outputs of a system. For example, a binary state or a bit that is stored in a memory can be inverted by irradiation with light, in particular with a laser. This means that the logical state is changed. Such scenarios occur e.g. in the event of attacks on safety systems, in order to discover internal secrets, e.g. cryptographic keys. It is possible that an error is static, i.e. that a memory permanently stores the manipulated state, in other examples these errors occur dynamically, i.e. they occur during the outer action, such as e.g. the irradiation by the laser, but are however not stored, i.e. a state manipulated by irradiation returns to the original state when the outer action ends.

A "fault attack" tries to bring about an error in a system, e.g. through irradiation with light, in order to derive internal relations or secrets from a faulty system behaviour, which can be observed e.g. based on the behaviour of its outputs. In particular, such attacks are carried out against cryptographic systems, whereby one tries to discover cryptographic keys or algorithms. Therefore, safety systems are protected against such attacks. It is required that a failure of such a system can practically be excluded.

A quality measure that is used for safety systems and in which is reflected the resistance to errors of a system induced from outside represents the PUE (PUE=Probability of Undetected Error). In a given attack scenario, the value of the PUE represents the probability that an aggressor will succeed in causing an faulty system behaviour, which can e.g. be observed by erroneous output values that can then be used for calculating or evaluating an internal secret. Typical values for the PUE are within the range of $2^{-30}$, the values within this range occur e.g. in EAL (EAL=Evaluation Assurance Level), where $2^{-30}$ would be considered as a typical value for EAL5+.

In the field of the conventional technique, no further aids are present for examinations of a safety level based on error recognition. The determination of the PUE of a system is therefore complex and cost intensive.

SUMMARY

According to an embodiment, a modeller for a system for determining a residual error probability may comprise a component modeller that is adapted to receive an error probability and to model a change of the error probability due to a behaviour of a system component, in order to output a changed error probability as residual error probability.

BRIEF DESCRIPTION OF THE DRAWINGS

Embodiments of the present invention will now be described more in detail, with reference to the attached drawings, in which.

DETAILED DESCRIPTION

In high security systems based on error recognition, the remaining residual error probability for a system is an essential determining factor. The components of such a system can be modelled regarding their probability of errors occurring, so that a system can be modelled in this way, e.g. in a software tool. Thus, e.g., for memories or logic circuits, the probabilities are reproduced according to which, e.g., special errors caused by a light attack can occur. The modelling of such errors relates to all components of the system. That is, all other parts of the system can also be modelled so that their behaviour can be reproduced for error recognition and, hence, a reduction of the residual error probability. The modelling does not only relate to those parts of the circuit in which errors can occur, thus those to which attacks are explicitly directed, such as, e.g., memories, but especially also to those parts in which the probability for not recognized errors is reduced. Some embodiments include a model of a system that transmits current values for residual error probability present at a location in the system to all following parts. This then provides finally a total system value for the remaining residual error probability through which the safety level of the system against error-causing attacks can be very well estimated. Based on this value, a PUE can also be indicated.

Figure 1A:
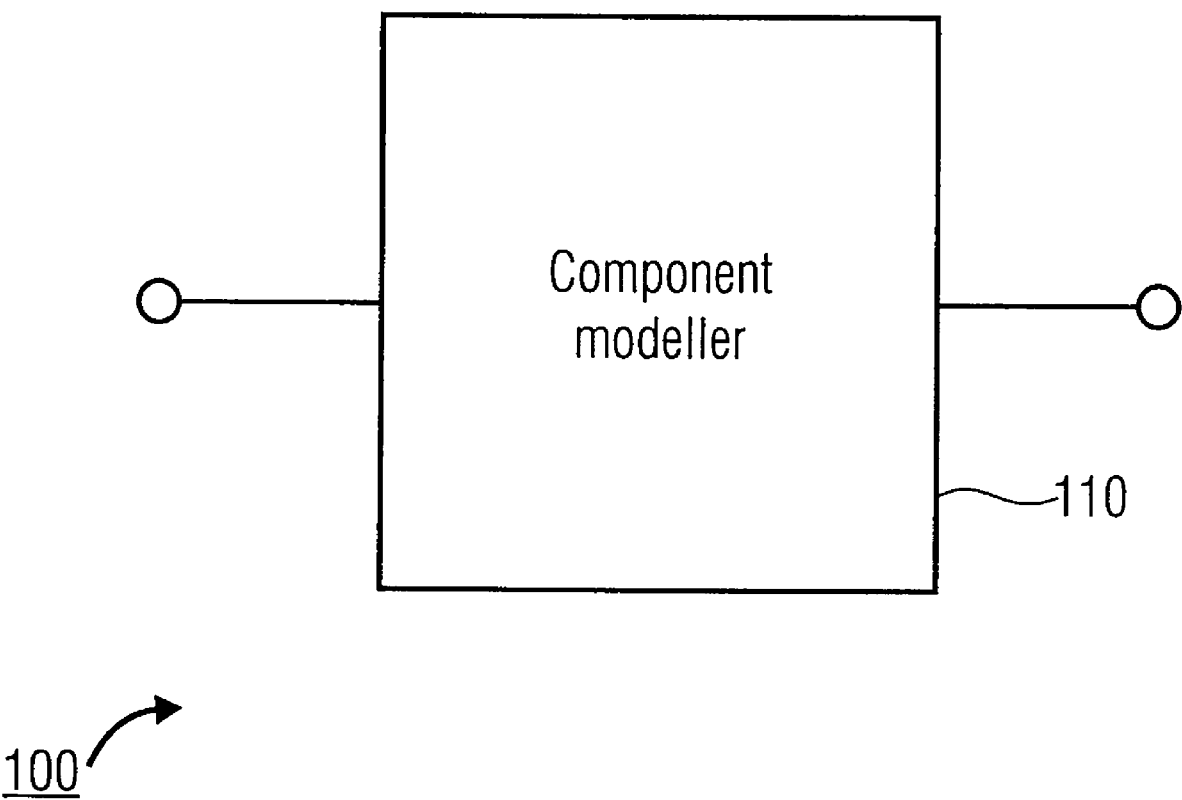
FIG. 1 is an embodiment of a modeller.
FIG. 1b is an embodiment of a device for modelling.

FIG. 1a shows an embodiment of a modeller 100 of a system for determining of a residual error probability. The modeller 100 includes a component modeller 110, which is adapted to receive an error probability and to model a change of the error probability due to a behaviour of a system component, in order to output a changed error probability as residual error probability. According to an embodiment, the component modeller 110 is adapted to receive a further error probability and the further error probability and to model a change of the error probability due to a behaviour of a system component, in order to output a changed error probability and a changed further error probability as residual error probability and as further residual error probability.

According to some embodiments, the component modeller 110 can be adapted to receive a vector of error probabilities and to output a change of the vector of error probabilities due to a behaviour of a system component as vector of residual error probabilities. The vector of error probabilities can, in one embodiment, include error probabilities of individual components, provided that an error effectively occurred, and a total error probability for the occurrence of an error. Furthermore, according to an embodiment, the component modeller 110 can be adapted to receive an attack error probability and to output a change of the error probability due to a behaviour of a system component based on the attack error probability as residual error probability.

In a further embodiment, the component modeller 110 can be adapted to receive a vector of attack error probabilities, the vector of attack error probabilities including error probabilities of individual components, provided that an attack occurs, and a probability that an attack occurs. According to a further embodiment, the modeller 100 can have a further component modeller that is adapted to receive the residual error probability or a vector of residual error probabilities and to model a change of the residual error probability or the vector of residual error probabilities due to a behaviour of a further system component, in order to output a changed residual error probability or a changed vector of residual error probabilities.

According to some embodiments, the component modeller 110 or the further component modeller can be adapted to model a behaviour based on an error correction and reducing an error probability. The component modeller 110 can e.g. be adapted to model a memory element, a memory or a processor.

According to FIG. 1a, the modeller 100 of a system for determining a residual error probability can include a component modeller 110, which is adapted to receive a vector of error probabilities, a component of the vector including a bit error probability, and the component modeller 110 being furthermore adapted to model a change of the vector of error probabilities due to a behaviour of a system component, in order to output a changed vector of error probabilities as vector of residual error probabilities.

In a further embodiment, the component modeller 110 can be adapted to receive a further vector of error probabilities and to model a change of the vector of error probabilities and the further vector of error probabilities due to a behaviour of a system component, in order to output a changed vector of error probabilities and a changed further vector of error probabilities as vector of residual error probabilities and as a further vector of residual error probabilities.

The vector or the further vector of error probabilities can include bit error probabilities of individual components, provided that an error occurred, and a total error probability for the occurrence of an error. The component modeller 110 can furthermore be adapted to receive a vector of attack error probabilities and to output a change of the vector of error probabilities due to a behaviour of a system component based on the vector of attack error probabilities as vector of residual error probabilities, whereby the vector of attack error probabilities can include bit error probabilities.

In a further embodiment, the modeller 100 can have a further component modeller, which is adapted to receive a vector of residual error probabilities and to model a change of the vector of residual error probabilities due to a behaviour of a further system component, in order to output a changed vector of residual error probabilities. The component modeller 110 or the further component modeller can be adapted to model a behaviour based on an error correction and which reduces an error probability. Furthermore, the component modeller 110 or the further component modeller can be adapted to model a memory element, a memory or a processor.

Figure 1B:
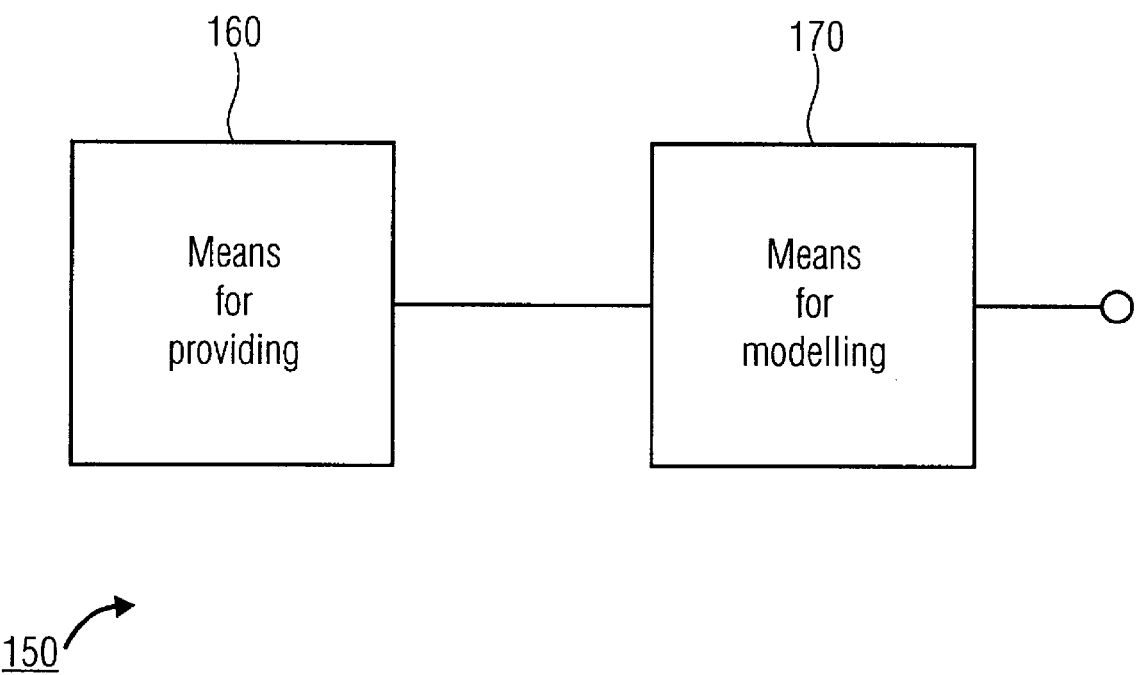

FIG. 1b shows a device 150 for modelling a system for determining a residual error probability. The device 150 includes means 160 for providing an error probability and means 170 for modelling a system component, which is adapted to receive the error probability and to model a change of the error probability due to a behaviour of the system component, in order to output a changed error probability as residual error probability.

According to an embodiment, the means 170 for modelling the system component can be adapted to receive a further error probability and to model a change of the error probability and the further error probability due to a behaviour of the system component, in order to output a changed error probability and a changed further error probability as residual error probability and as further residual error probability.

The means 170 for modelling the system component can furthermore be adapted to receive a vector of error probabilities and to output a change of the vector of error probabilities due to a behaviour of a system component as vector of residual error probabilities. The vector of error probabilities can include error probabilities of individual components, provided that an error occurred and a total error probability for the occurrence of an error.

In a further embodiment, the means 170 for modelling the system component can furthermore be adapted to receive an attack error probability and to output a change of the error probability due to a behaviour of the system component based on the attack error probability as residual error probability. The means 170 for modelling the system component can furthermore be adapted to receive a vector of attack error probabilities, the vector of attack error probabilities including error probabilities of individual components, provided that an attack occurs, and a probability that an attack occurs.

In a further embodiment, the device 150 can furthermore have further means for modelling a system component, which is adapted to receive the residual error probability or a vector of residual error probabilities and to model a change of the residual error probability or of a vector of residual error probabilities due to a behaviour of a further system component, in order to output a changed residual error probability or a changed vector of residual error probabilities. The means 170 for modelling the system component or the means for modelling the further system component can be adapted to model a behaviour based on an error correction and reducing an error probability. The means 170 for modelling the system component can furthermore model a memory element, a memory or a processor.

Figure 2:
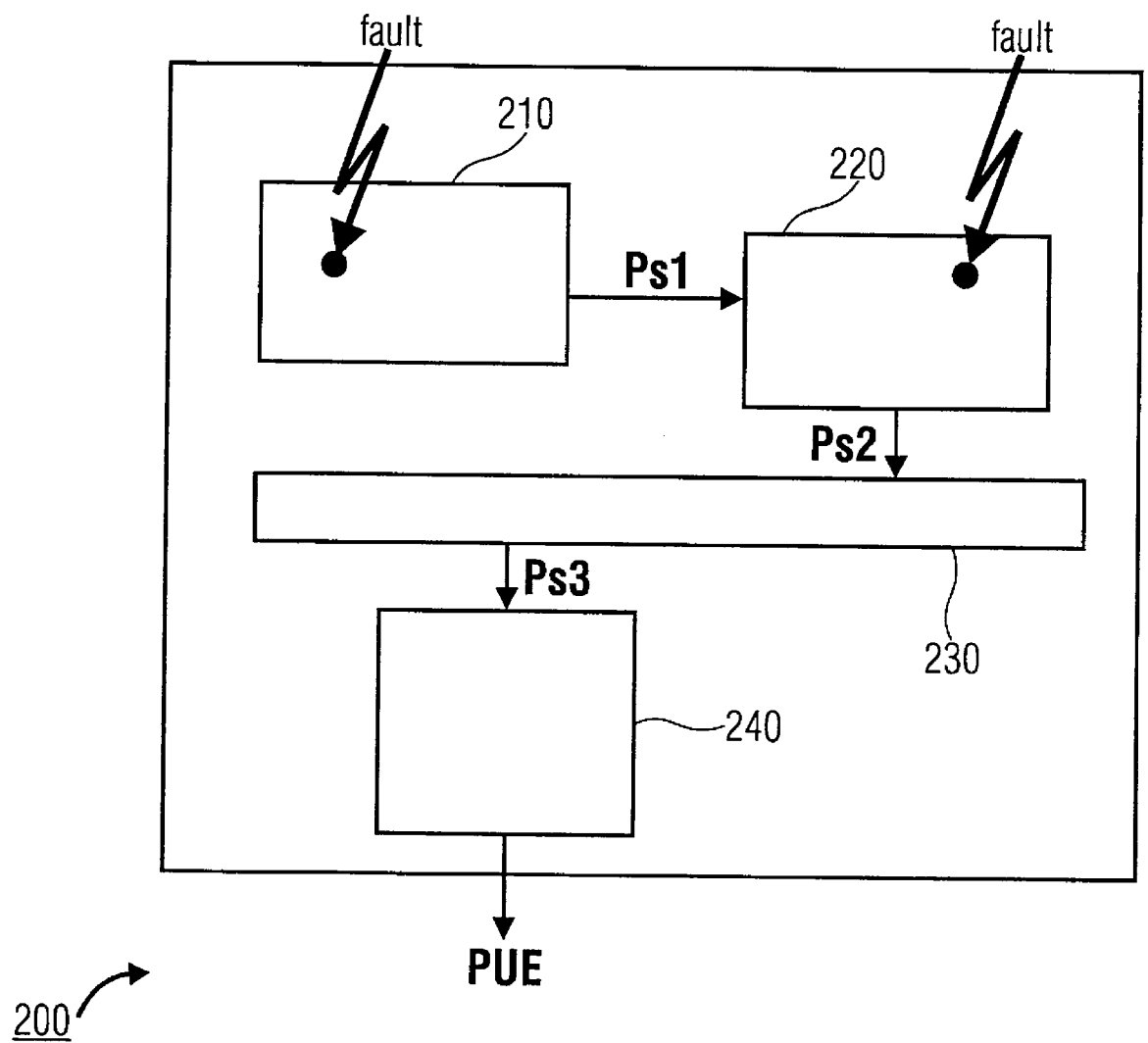
FIG. 2 is an embodiment of a system with several modellers.

FIG. 2 shows a modeller 200 of a system, which has four means for modelling 210, 220, 230 and 240. The means 210 for modelling a system component can be attacked by a "fault attack". The means 210 for modelling a system component transmits to the means 220 for modelling a system component a vector of error probabilities Ps1. Based on this vector of error probabilities the means 220 models a further system component, which can also be subject to a "fault attack". The means 220 then transmits a vector of error probabilities Ps2 to third means 230 for modelling a system component, which, in turn, transmits a vector of error probabilities Ps3 to means 240 for modelling a further system component. The means 240 for modelling the fourth system component then outputs a residual error probability PUE. In the modelling system 200, shown in FIG. 2, the means 230 could have e.g. error recognition means, whereby Ps3 could then include error probabilities that are smaller than the error probabilities in Ps2.

Some embodiments according to FIG. 2, which have an arbitrary number of means for modelling system components, can be implemented e.g. in software, by means of which safety systems can then be modelled so that appropriate residual error probabilities are provided as an input to the means for modelling the system component and by means of which probability changes to be modelled, positive changes meaning that errors are induced and negative changes meaning that errors are recognized, can be calculated to obtain an output value that, in FIG. 2, is represented e.g. as PUE. The resulting output value of such a total system can then be used for determining a safety level.

In the field of the conventional technique, system simulations are typically performed based on signal vectors. When data are transferred e.g. via a bus, a data vector with the corresponding number of bits is used in simulation applications. In the field of modelling of safety systems or in the field of simulation of safety levels, both logical and physical, the signals themselves are of subordinated interest. The centre of interest in this field is the probability that a bit error will occur, and, hence, in some embodiments this probability of occurrence of bit errors in the involved signals is reflected in the simulation. This results e.g. into a type of vectors, which are described more in detail hereafter, and which are used in the system simulation for exchange between individual system components.

A vector generally consists of several signals, for each signal $s_x$ existing a probability $PS_x$, with $0 \leq Ps_x \leq 1$, by which an error probability of the signal $s_x$ can be described, provided that at least one error occurred. In addition, in these vectors is indicated a total error probability $Pg$ for all the signals represented in this vector, which effectively reflects the probability of occurrence of an error.

For example, a signal vector could be $$\vec{s} = \begin{bmatrix} s_0 \\ s_1 \\ \cdots \\ s_{n-1} \end{bmatrix}.$$

The probabilities of bit errors in such a signal together with the probability of an effective occurrence of an error can then be combined into a vector, e.g. into $$\vec{PV} = \begin{bmatrix} Ps_0 \\ Ps_1 \\ \cdots \\ Ps_{n-1} \\ Pg \end{bmatrix}.$$

According to an embodiment, an 8-bit memory module with 8-bit memory lines could be attacked with a laser that is focused onto the position of the third bit. The total probability that such an attack causes an error in the memory module is here assumed to be 0.02. Furthermore, it is known that the probability that a bit that is directly proximate to a disturbed bit will change its state is smaller by a factor 10. The probability vector in this example would thus become $$\vec{PV}_{example} = \begin{bmatrix} 0 \\ 0.1 \\ 1 \\ 0.1 \\ 0 \\ 0 \\ 0 \\ 0 \\ 0.02 \end{bmatrix}.$$

According to the above example, the upper eight lines of the vector represent the probability distribution, provided that the signal vector is disturbed. The probability that such a disturbance is present is 0.02. Thus, the probability that a disturbance of the third bit is present is therefore the probability that the second or fourth bit is disturbed, equal to 0.1·0.02.

In further embodiments, attack probabilities can also be modelled. An attack vector then describes an attack scenario as regards its error probabilities. Such an attack vector has then e.g. the same format as the error vector $\vec{PV}_{example}$ described in the above example. For example, an attack on a memory or a memory module can be described by means of such an attack vector, which in one embodiment may have the same form as $\vec{PV}_{example}$.

Figure 3:
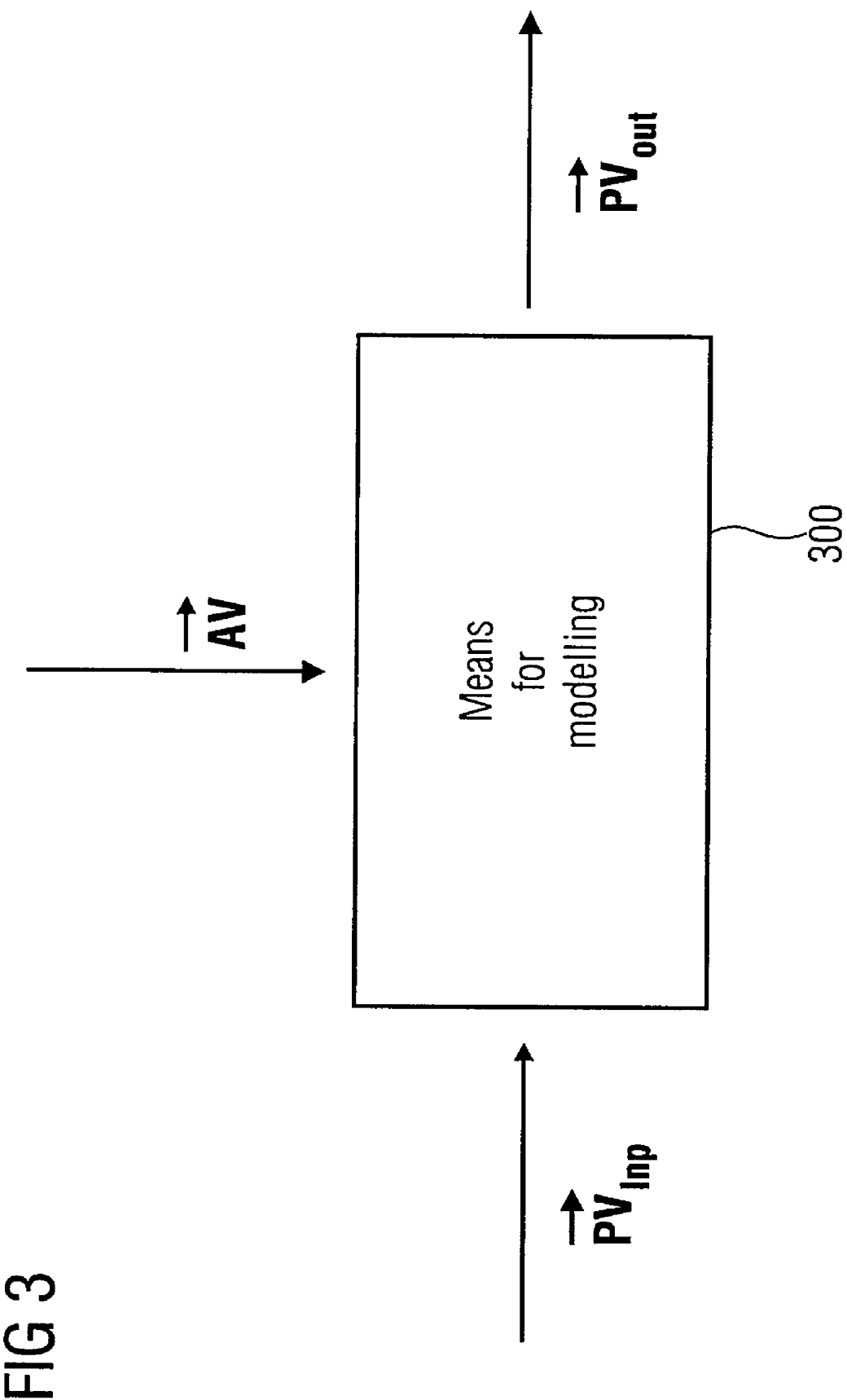
FIG. 3 is an embodiment of means for modelling.

FIG. 3 shows means 300 for modelling a system component, which receives of vector of error probabilities $$\vec{PV}_{inp},$$

and outputs a vector of error probabilities $$\vec{PV}_{out}.$$

The means 300 for modelling a system component furthermore receives a vector of error probabilities $$\vec{AV}$$

which represents an attack vector. Generally, a system is thus subdivided into means 300 or units 300, which are modelled according to their behaviour with respect to influencing the PUE, i.e. the probability of undetected errors. For example, an error detection unit, thus means for modelling a system component having an error correction, can reduce the residual error probability or PUE, so that an output vector of error probabilities $$\vec{PV}_{out}$$

has components that are smaller than those of an input error vector $$\vec{PV}_{inp}.$$

The attack vector $$\vec{AV}$$

describes the probability that an attack occurs, but can however also describe a behaviour of the system component itself, i.e. the probability that a further error occurs in that system component.

In a further embodiment, no data processing takes place in a system component. In this case, the output vector $$\vec{PV}_{out}$$

can be calculated simply in that to the input vector of error probabilities $$\vec{PV}_{inp}$$

is added the error probability vector $\vec{AV}$ or attack error probability vector. In a further embodiment, e.g. a memory cell, for which no input error probabilities are taken into consideration, could be described in that the attack error probability vector $$\vec{AV}$$

is directly output as output error probability vector $$\vec{PV}_{out}.$$

In particular, the attention is drawn to the fact that according to the circumstances, some embodiments can also be implemented in software. The implementation can occur on a digital storage medium, in particular a disk, a CD or a DVD with electronically readable control signals, which can cooperate with a programmable computer system so that the corresponding method can be performed. Generally, some embodiments, thus, also consist in a computer program product with a program code stored on a machine-readable carrier for carrying out the method according to the invention when the computer program product is executed on a computer. In other words, the invention can thus be implemented as a computer program with a program code for performing the method when the computer program is executed on a computer.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. A non-transitory computer readable storage medium storing program code for controlling a computer to estimate a safety level of a circuit by determining a residual error probability for the circuit, the program code comprising:
a component modeller, which is adapted to receive a vector of error probabilities, each error probability associated with one of a number of bit lines of the circuit, and the component modeller being furthermore adapted to model a change of the vector of error probabilities due to a behaviour of a system component, in order to output a changed vector of error probabilities as vector of residual error probabilities,
wherein the component modeller is adapted to receive a vector of attack error probabilities and to output a change of the vector of error probabilities due to a behavior of a system component based on the vector of attack error probabilities as vector of residual error probabilities,
wherein the vector of attack error probabilities includes an attack error probability for each of the number of bit lines of the circuit, wherein an influence of a disturbed bit line to the attack error probability associated with a bit line proximate to the disturbed bit line is reflected in the attack error probability vector or the change of the vector of error probabilities.

2. The computer readable storage medium according to claim 1, wherein the component modeller is adapted to receive a further vector of error probabilities and to model a change of the vector of error probabilities and the further vector of error probabilities due to a behaviour of a system component, in order to output a changed vector of error probabilities and a changed further vector of error probabilities as vector of residual error probabilities and as a further vector of residual error probabilities.

3. The computer readable storage medium according to claim 1, wherein the vector or the further vector of error probabilities includes bit error probabilities of individual components, provided that an error occurred, and a total error probability for the occurrence of an error.

4. The computer readable storage medium according to claim 1, having furthermore a further component modeller that is adapted to receive a vector of residual error probabilities and to model a change of the vector of residual error probabilities due to a behaviour of a further system component, in order to output a changed vector of residual error probabilities.

5. The computer readable storage medium according to claim 1, wherein the component modeller is adapted to model a behaviour based on an error correction and reducing an error probability.

6. The computer readable storage medium according to claim 1, wherein the component modeller is adapted to model a memory element or a memory.

7. The computer readable storage medium according to claim 1, wherein the component modeller is adapted to model a processor.

8. A method performed by a computer system for modelling a circuit for estimating a safety level of the circuit by determining a residual error probability, the method comprising:
providing, with the computer system, a vector of error probabilities, each error probability associated with one of a number of bit lines of the circuit;
receiving, with the computer system, the vector of error probabilities;
receiving, with the computer system, a vector of attack error probabilities;
modelling, with the computer system, a change of the vector of error probabilities due to a behavior of a system component based on the vector of attack error probabilities; and
providing, with the computer system, the change of the vector of error probabilities as the residual error probability,
wherein the vector of attack error probabilities includes an attack error probability for each of the number of bit lines of the circuit, wherein an influence of a disturbed bit line to the attack error probability associated with a bit line proximate to the disturbed bit line is reflected in the attack error probability vector or the change of the vector of error probabilities.

9. A computer program product comprising a non-transitory computer readable medium storing a program code when executed on a computer performing a method for modelling a circuit for estimating a safety level of the circuit by determining a residual error probability, the method comprising:
providing a vector of error probabilities, each error probability associated with one of a number of bit lines of the circuit;
receiving the vector of error probabilities;
receiving a vector of attack error probabilities;
modelling a change of the vector of error probabilities due to a behavior of a system component based on the vector of attack error probabilities; and
providing the change of the vector of error probabilities as the residual error probability,
when the program code is executed on a computer,
wherein the vector of attack error probabilities includes an attack error probability for each of the number of bit lines of the circuit, wherein an influence of a disturbed bit line to the attack error probability associated with a bit line proximate to the disturbed bit line is reflected in the attack error probability vector or the change of the vector of error probabilities.

* * * * *